Aug. 9, 1932. C. COOPER ET AL Re. 18,563

DEHYDRATION OF FUEL GASES

Original Filed Jan. 30, 1926

INVENTORS
C. COOPER AND D. M. HENSHAW
BY
ATTORNEYS.

Reissued Aug. 9, 1932

Re. 18,563

UNITED STATES PATENT OFFICE

CHARLES COOPER AND DANIEL MAYON HENSHAW, OF HUDDERSFIELD, ENGLAND, ASSIGNORS TO W. C. HOLMES AND COMPANY, LIMITED, OF HUDDERSFIELD, ENGLAND

DEHYDRATION OF FUEL GASES

Original No. 1,614,347, dated January 11, 1927, Serial No. 85,044, filed January 30, 1926, and in Great Britain December 11, 1924. Application for reissue filed January 2, 1929. Serial No. 329,857.

This invention relates to the manufacture of fuel gases.

As is well known, mains used for conveying fuel gases become corroded relatively rapidly and particularly in cases where the oxygen content of the gas is somewhat high, or where other bodies promoting corrosion are present therein.

Of the several bodies present in fuel gas to which the corrosion may be attributed, sulphur compounds, cyanogen compounds, carbon dioxide, oxygen and water may be cited.

The invention is based upon the observation that the corrosive action of some of all of the constituents of fuel gases to which the corrosion may be attributed may be minimized or inhibited by the reduction in moisture content of the gas, our experiments appearing to indicate that the desired result may be secured if the content of water vapour in the gas is reduced to such an extent that deposition of water in the pipes cannot occur, by subjecting fuel gases preferably at the normal pressures under which such gases are distributed and under temperatures not materially below atmospheric temperature to the action of hygroscopic or water-absorbing bodies in the liquid state with preferably the continuous or intermittent treatment of the hygroscopic material to convert it, by the expulsion of the absorbed water, into the condition in which it may be used in the treatment of further quantities of gas.

Conveniently for bringing the gas and absorbent material into intimate contact when employing a hygroscopic liquid, a so-called "brush-washer" of the character described, for instance, in the specification of British Patent No. 162,166, is employed but it will be understood that the invention is not limited in this respect.

The drying operation may be of such character as to effect substantially complete removal of the water, or to secure such a reduction in the moisture content that deposition of water within the mains is prevented, or to secure that on the average the dew point of the gas is such that any moisture separating due to cooling will subsequently be evaporated, or to the reduction of the moisture content to a degree which will render the removal of a further proportion of moisture by other means, for instance, by the use of reagents such as silica gel, commercially practicable or economical.

Referring to the third procedure set forth in the preceding paragraph, it will be obvious that since the gas has thus been partially dehydrated but not to such degree as to prevent any deposition at all of moisture at any point in the mains (as in the first and second instances mentioned) such cooling as will cause deposition, in the said third instance, can only take place at points of minimum temperature in the distributing mains.

It will also be obvious that while in this instance the gas is dehydrated sufficiently to eventually prevent the presence of moisture in the mains, consistently with the general object of the invention as a whole, nevertheless the gas is not dehydrated to such extent as to be capable of picking up excessive amounts of moisture from the mains and thus causing an excessively rapid dying out of the mains, which is undesirable for many reasons.

Where moisture-absorbing material employed in such further treatment of the gas is of a solid character, the procedure and apparatus forming the subject-matter of the application for British Patent No. 162,166 may be adopted.

The treatment to secure these various degrees may vary in intensity or in the means employed or in the material used as the dehydrating substance. For example, for a partial removal it might be sufficient to employ a solution in water of a substance not recognized as hygroscopic, as it is known that the vapour pressure of such a solution is in general lower than that of water at the same temperature. Such a solution is to be considered included in the following description under the term "hygroscopic or water-absorbing material."

An arrangement of apparatus for carrying the invention into effect is illustrated diagrammatically and by way of example in the accompanying drawing, in which:—

Figure 1:
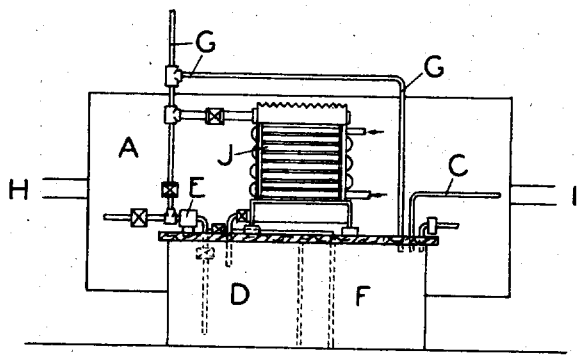
Figure 1 is a side elevation.
Figure 2:
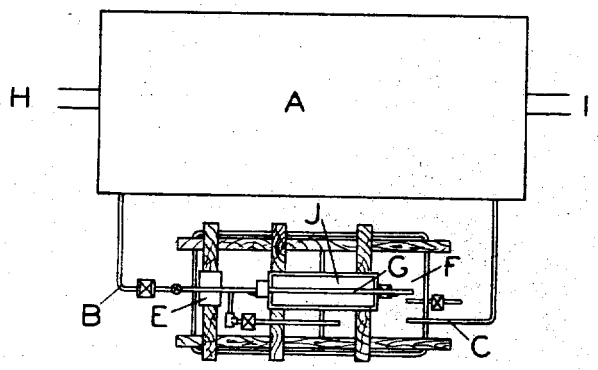
Figure 2 is a view in plan.

In the drawing, A is the brush-washer, B the inlet and C the outlet for the liquid employed. A solution of calcium chloride is prepared in the tank D and pumped into the washer by means of the pump E connected to the inlet B. The liquid reservoir of the washer is filled with a solution of such concentration as will give desired results by virtue of its partial pressure of water vapour. Dilution occurs in the liquid due to the absorption of water from the gas.

A further quantity of solution is now added and it is obvious that the quantity is determined by the necessity for reproducing the original conditions, or making a permanent cycle of operations.

The diluted liquor is partially displaced from the washer and passes from the outlet C into the tank F. When the operation of introducing the fresh material is completed the pump is employed to circulate the diluted solution as follows:

A continuous stream of the liquid is pumped through a pipe line G, G, returning to the tank F, and it is arranged so that a smaller stream can be tapped off into a trough H having perforations or serrated edges to give a reasonably uniform distribution of liquid along its length. This arrangement is an application of known devices. The diffused or divided streams are allowed to trickle down over horizontally laid tubes J, vertically over each other, and connected together at their ends to form a conduit for the heating medium, for instance live or exhaust steam. The heated liquid is deprived of a portion of its water content by exposure to the air in this manner and returns to the tank F. In course of time a concentration is reached which is suitable for the fresh liquid entering the washer. During the last stages therefor the regenerated liquid is gradually transferred to the other tank D so as to leave the tank F free for the next charge of diluted solution.

The regenerated solution may be cooled by any suitable means if desired before being pumped into the washer again.

It is evident that the periodical introduction of fresh absorbing liquid may be substituted by a continuous flow of liquid. For example, the overflowing diluted solution may be caused to pass through the concentration process immediately on leaving the washer and may be further continuously repumped to the washer inlet, the rate of operation of this pump governing the rate of circulation generally. Such pump may conveniently be driven by any power unit driving the mechanism of the washer.

Such a continuous circulation would be suited to such types of gas washers as are designed to contain only a small quantity of wash liquor at a time, whereas the type mentioned in the above detailed description has relatively large reservoirs for liquid.

Such modifications of practice do not affect the principle of the invention nor does the introduction in either the first or the alternative methods of storage tanks to retain a stock of strong or diluted absorbent, or the introduction of cooling devices for the liquid.

Instead of the construction of evaporator referred to in the above detailed description, any other convenient form of evaporator may be employed.

Having now described our invention, what we claim as new and desire to secure by Letters Patent is:—

1. The process of treating industrial fuel gases prior to transportation in the mains which comprises, subjecting said gases to the action of hygroscopic or water-absorbing bodies in the liquid state until the moisture content of the gas has been reduced merely to such degree that on the average the dew point of the gas is such that moisture separated from the gas by cooling at points of minimum temperature in the mains will subsequently be evaporated by the gas, whereby permanent deposition of moisture is prevented and corrosion of the mains inhibited without an excessively rapid drying out of the mains.

2. The process of treating industrial fuel gases prior to transportation in the mains which comprises, dehydrating said gases until the moisture content of the gas has been reduced merely to such degree that on the average the dew point of the gas is such that moisture separated from the gas by cooling at points of minimum temperature in the main will subsequently be evaporated by the gas, whereby permanent deposition of moisture is prevented and corrosion of the mains inhibited without an excessively rapid drying out of the mains.

CHARLES COOPER.
DANIEL MAYON HENSHAW.